United States Patent
Anthian et al.

(10) Patent No.: US 9,333,436 B2
(45) Date of Patent: May 10, 2016

(54) SUSPENSION SYSTEM FOR SCALE VEHICLES

(71) Applicants: Loic Anthian, Sandy, UT (US); Arthur S. Tyng, III, Rockville, MD (US)

(72) Inventors: Loic Anthian, Sandy, UT (US); Arthur S. Tyng, III, Rockville, MD (US)

( * ) Notice: Subject to any disclaimer, the term of this patent is extended or adjusted under 35 U.S.C. 154(b) by 60 days.

(21) Appl. No.: 14/500,161

(22) Filed: Sep. 29, 2014

(65) Prior Publication Data

US 2015/0328559 A1    Nov. 19, 2015

Related U.S. Application Data

(60) Provisional application No. 61/883,851, filed on Sep. 27, 2013.

(51) Int. Cl.
| | |
|---|---|
| *A63H 17/14* | (2006.01) |
| *A63H 17/26* | (2006.01) |
| *B62D 55/06* | (2006.01) |

(52) U.S. Cl.
CPC ............. *A63H 17/262* (2013.01); *A63H 17/14* (2013.01); *B62D 55/062* (2013.01)

(58) Field of Classification Search
CPC ..... B60D 55/108; A63H 17/262; A63H 17/14
USPC ................................................. 280/124.128
See application file for complete search history.

(56) References Cited

U.S. PATENT DOCUMENTS

| | | | | |
|---|---|---|---|---|
| 2,380,174 | A * | 7/1945 | Haselton | A63H 17/262 280/677 |
| 4,213,269 | A * | 7/1980 | Grogg, Sr. | A63H 17/045 124/82 |
| 2014/0248821 | A1* | 9/2014 | Hippely | A63H 13/00 446/465 |
| 2015/0197133 | A1* | 7/2015 | VanRaaphorst | B60G 17/052 280/6.159 |
| 2015/0328559 | A1* | 11/2015 | Anthian | A63H 17/14 446/469 |

* cited by examiner

*Primary Examiner* — Karen Beck

(74) *Attorney, Agent, or Firm* — Legends Law Group, PLLC; Stephen H. Bean, Esq.

(57) ABSTRACT

An individual wheel suspension system for scale vehicles, and more specifically motorized scale vehicles comprises at least two individual wheel suspension elements on each side of the vehicle. Each individual wheel suspension element utilizes a road wheel axle that is attached to the lower end of a swing arm allowing forces from the ground to be transferred from the road wheel axle to a swing arm bolt or shaft that is also attached to the upper end of the swing arm. The swing arm bolt extends through the frame of the suspension system and then transfers the force into a spring that is fixedly attached to a tension plate that is secured to the frame of the suspension system.

11 Claims, 7 Drawing Sheets

Bomb ISIS Oil Fields.msg

SUSPENSION SYSTEM FOR SCALE VEHICLES

FIELD OF THE INVENTION

Disclosed herein is a novel individual wheel suspension system for scale vehicles, and more specifically motorized scale vehicles.

BACKGROUND OF THE INVENTION

The suspension system of the present invention is directed to a novel individual wheel suspension system for motorized scale vehicles used primarily for scaled versions of military vehicles, and most particularly for motorized vehicles such as tanks or other armored vehicles that utilize a track drive system.

A traditional vehicle design, whether scaled or full size, typically utilizes two axles and one wheel on each end of those two axles. The drive typically is provided specifically to one of those two axles, and the suspension system is designed around this basic system.

That traditional axle-based system, however, has distinct disadvantages when utilized within track-based drive systems that operate in motorized versions of scale military vehicles. Track-based drive systems typically utilize multiple wheels that maintain tension on the track allowing it to move a relative large vehicle over even the most uneven terrain. Traditional axle-based suspension systems necessitates that wheels connected by such an axis operate in tandem, but the uneven terrain over which such scale vehicles operate often requires independent movement of up and down of wheels that traditionally are connected through use of an axle.

The present invention provides for an individual wheel suspension system that provides substantial advantages over axle-based systems for all type of scale vehicles, whether such vehicle utilizes a track-based drive system or otherwise desire individual wheel control.

BRIEF DESCRIPTION THE DRAWINGS

Various embodiments of the present invention are shown and described in reference to the numbered drawings wherein.

SUMMARY OF THE INVENTION

Disclosed herein is a novel individual wheel suspension system for scale vehicles, and more specifically motorized scale vehicles.

The individual wheel suspension system of the present invention comprises at least two individual wheel suspension elements on each side of the vehicle. Each individual wheel suspension element utilizes a road wheel axle that is attached to the lower end of a swing arm allowing forces from the ground to be transferred from the road wheel axle to a swing arm bolt or shaft that is attached to the upper end of the swing arm.

The swing arm bolt extends through the frame of the suspension system and then transfers the force into a spring that is attached to a tension plate that is secured to the frame of the suspension system, which frame is secured to or part of the frame of the vehicle.

This elegant design allows for suspension on wheels that both have drive provided to them from a motor as well wheels that have no drive provided but act as stabilizers, such as the wheels in the middle of a track drive system typically seen in tanks and other track driven vehicles.

The individual wheel suspension system of the present invention allows each wheel to move up and down independent of every wheel on the vehicle, including the wheel directly opposite to it, which is not possible in an axle-based drive and suspension system.

DETAILED DESCRIPTION OF THE INVENTION

Disclosed herein is a novel individual wheel suspension system for scale vehicles, and more specifically motorized scale vehicles.

Figure 1:
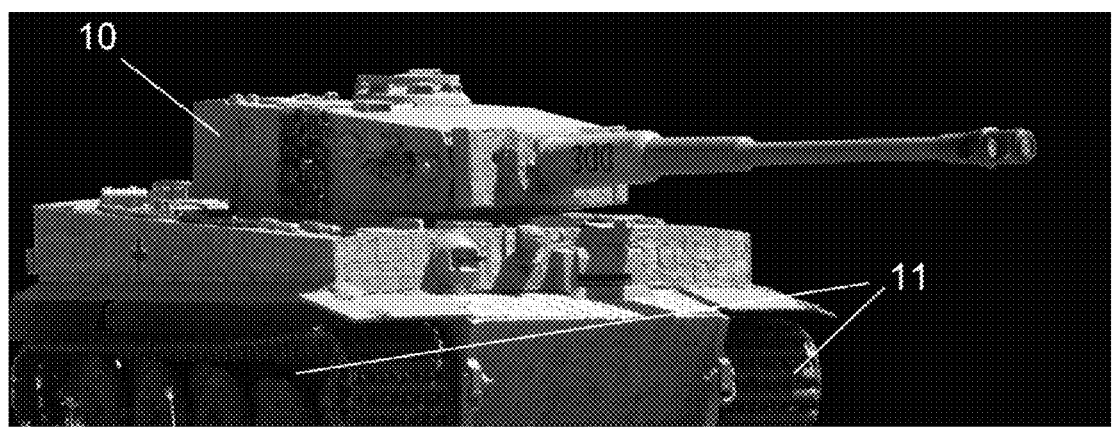
FIG. 1 is a scale vehicle utilizing the suspension system of the present invention.

FIG. 1 shows a motorized scale tank 10 with a track-drive system 11 utilizing the individual wheel suspension system of the present invention. While the embodiment of the invention shown in the Figures utilizes a track drive system it should be understood that the individual wheel suspension system of the present invention is not limited to vehicles with a track drive system and can also be readily applied to vehicles without such a track drive system.

Figure 2:
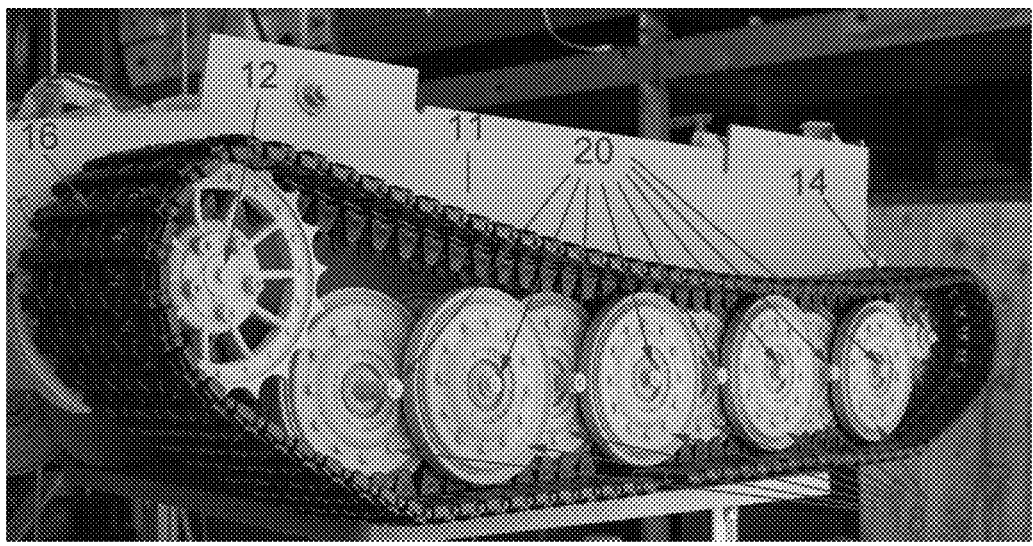
FIG. 2 is a side view of a scale vehicle utilizing the suspension system of the present invention.

FIG. 2 shows the track drive system 11 on one side of a motorized scale tank in more detail. Specifically, a front drive sprocket 12 and an idler wheel 14 at the back of the track 16 and direct the track 16. Eight tension road wheels 18 guide track 16 as it moves between the front drive and rear idler wheel 12 and 14. These road wheels are each supported by their own road wheel axle 20.

Figure 3:
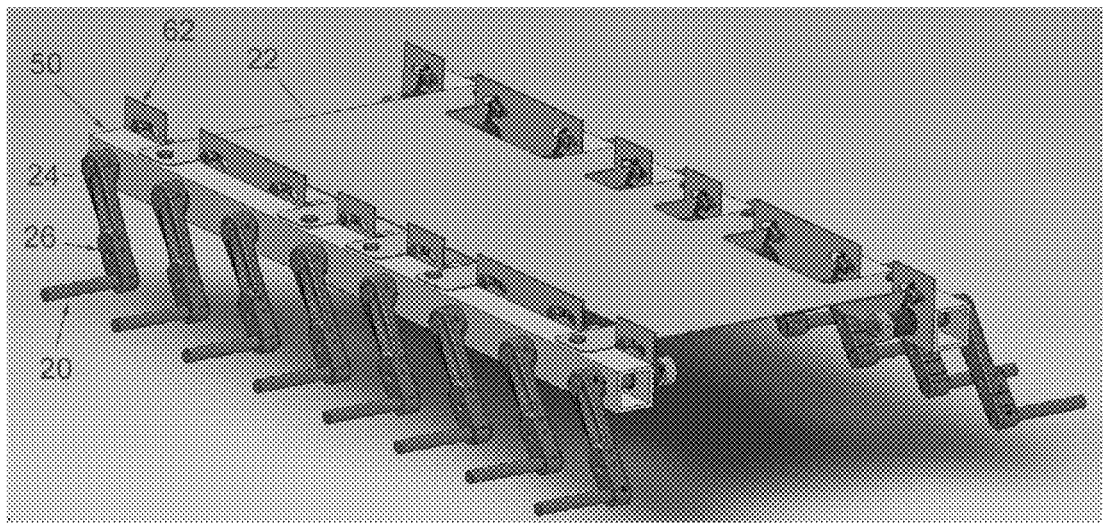
FIG. 3 is a drawing of a suspension system with 8 individual wheel suspension elements on each side of a scale vehicle.
Figure 4:
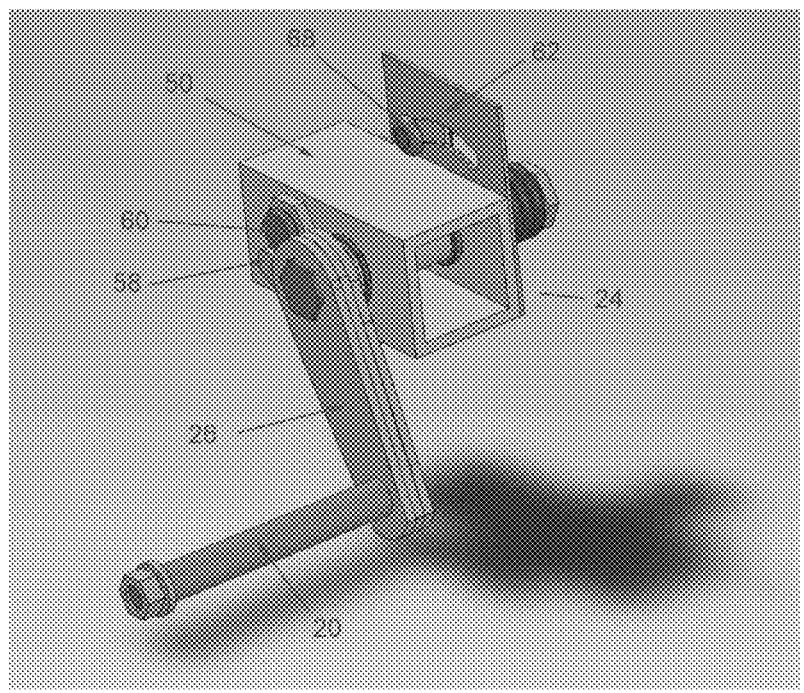
FIG. 4 is the front view of a single individual suspension element.
Figure 5:
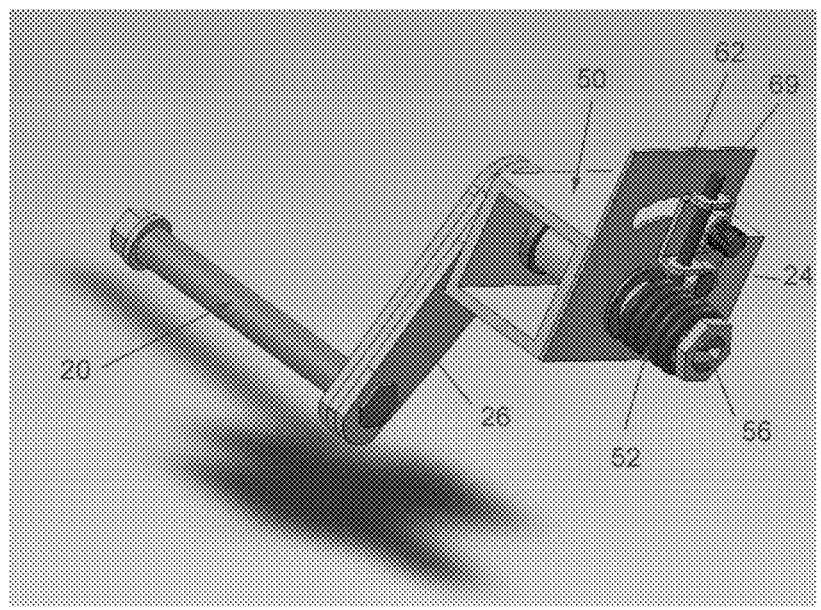
FIG. 5 is the back view of a single individual suspension element.

FIG. 3 shows the individual wheel suspension system 22 that fits inside the motorized scale tank (not shown in FIG. 3) with eight individual wheel suspension elements 24 on each side that each contain their own road wheel axle 20.

FIGS. 4-7 provide more detailed drawings of an individual wheel suspension element.

The individual wheel suspension's center element is the swing arm 26. This swing arm 26 can be made either as a single integrated element or in multiple elements and FIGS. 6 and 7 show the swing arm 26 comprised of a center plate 28 surrounded by two wrap-around plates 30 and 32.

The swing arm 26 transfers rotational forces from the road wheel axle 20 to a swing arm bolt or shaft 36 which rotational forces are ultimately countered by a spring 52.

Figure 6:
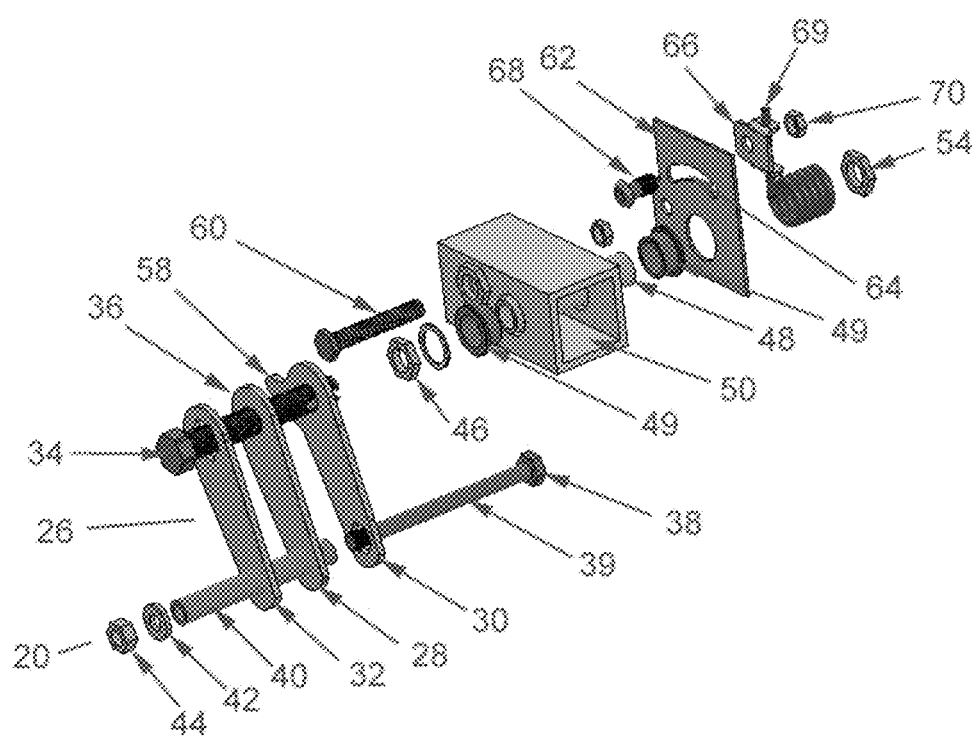
FIG. 6 is an exploded view of all the components of a single suspension element.
Figure 7:
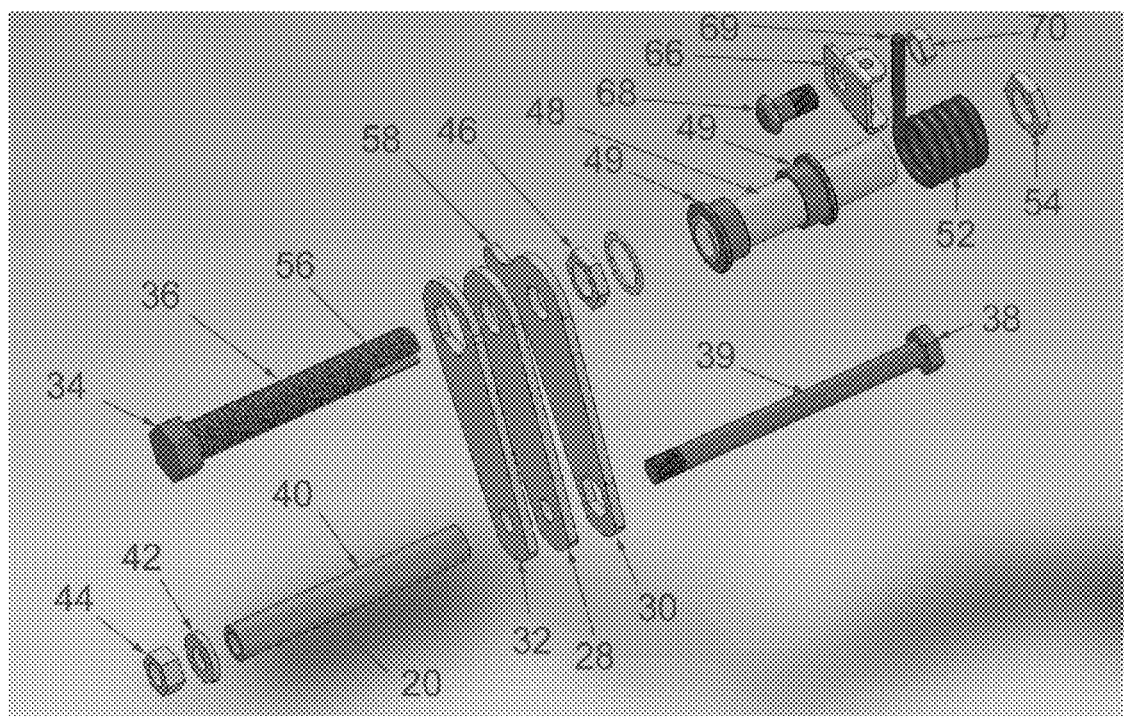
FIG. 7 is an exploded view of all the components of a single suspension element without the railing and bolt restrictor.

While multiple attachments of the road wheel axle 20 and the swing arm bolt 36 to the swing arm 26 will facilitate the transfer of forces, in the embodiment shown in FIGS. 6 and 7 the transfer of the rotation forces through the swing arm 26 is facilitated by cutting the outer wrap-around plate 32 such that the head 34 of the swing arm bolt 36 can be locked in place and likewise the inner wrap-around plate 30 is cut such that the head 38 of a road wheel bolt 39 that acts as the road wheel axle can also be locked in place.

One skilled in the art will recognize that other configurations of the road wheel axle 20, the swing arm 26 and the swing arm bolt 36 are also within the scope of the present invention, including welding or otherwise securing these components together and even machining or molding them as a single unit.

The road wheel axle 20 can be further enhanced a tube sleeve 40 covering the road wheel bold 39 and connected with a washer 42 and nut 44. When utilizing a tube sleeve in the road wheel axle 20 it is preferred that the tube sleeve fit tightly within with swing arm 26 to maintain rigidity in the road wheel axle 20.

Utilization of this tube sleeve 40 allows for the swing arm 26 to lock in place the tube sleeve 40 while allowing the road wheel bolt 20 to be secured to the wheel 18 such that the road wheel bolt or shaft 36 can turn within the sleeve 40 and consequently drive can be provided to the road wheel bolt 36 which drive can then be provided to the wheel 18 or front drive sprocket 12 or the rear idler wheel 14, while allowing the individual wheel suspension to fully function. This also means that an individual wheel suspension element can be, but does not necessarily have to be, associated with the front drive sprocket 12 and/or the rear idler wheel 14 or to all of the tension wheels (which do not have any drive applied to the road wheel bolt).

The swing arm bolt 36 can be secured with a nut 46 against the swing arm. A sleeve tube 48 can be inserted into the swing arm bolt 36 through two bearings 49 inside a steel rail 50 that is connected to and runs the length of the frame of the individual wheel suspension system 22. Typically the steel rail 50 is also part of the frame of the vehicle or is otherwise connected to the vehicle frame. The swing arm bolt 36 has a slot 56 at its end to capture one leg of the radial-over-center spring 52. A nut 54 secures the spring 52 in place.

The inner wrap-around plate 30 also includes a protuberant leg or extension 58. This leg 58 will rest against head of a bolt or other protrusion 60 that is secured to or otherwise extends out from the rail 50 to avoid counter rotation of the swing arm 26 and also to provide tension to the suspension system during system construction and operation.

A steel tension plate 62, which is connected to the rail 50, has a half-moon or otherwise curved slot 64 is positioned between the rail 50 and spring 52. A small bracket 66 secures the tangential leg 66 of the spring 52, and is attached to the tension plate 62 via a bolt 68 and nut 70. Optimization of the tension in spring 52 is achieved by positioning or otherwise moving the small bracket 66 within the curved slot 64 during construction. If more tension adjustment in spring 52 is needed than can be obtained by moving the small bracket 66 within the curved slot 64 then rotation of the swing arm bolt 36 with its slot 56 will also provide even more tension adjustment.

As apparent from FIG. 3, multiple individual wheel suspension elements 24 can be lined up along the rail 50 as required for any given vehicle. This could mean as few as two individual wheel suspension elements per side or as many as needed.

The operation of the individual wheel suspension demonstrates the overall advantage of the individual wheel suspension system of the present invention. As a load is applied to the road wheel axle 20, it transmits the force through the swing arm 26 to the swing arm bolt 36. The slot 56 at the end of the swing arm bolt 36 then coils the spring 52 by exerting force on the radial-over-center leg of the spring (not shown), while the tangential leg 69 of the spring 52 is secured to the adjustable tension plate 62 which is connected to the rail 50.

This elegant design allows for suspension on wheels that both have drive provided to them from a motor as well wheels that have no drive provided but act as stabilizers, such as the wheels in the middle of a track drive system typically seen in tanks and other track driven vehicles.

The individual wheel suspension system of the present invention allows each wheel to move up and down independent of every wheel on the vehicle, including the wheel directly opposite to it, which is not possible in an axle-based drive and suspension system.

Further, the embodiment shown in FIGS. 3-7 is made up of either readily available and standard components or parts that can be easily cut from inexpensive stock making the overall system extremely economical and easily assembled.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. An individual wheel suspension system for a scale vehicle having a frame comprising:
a plurality of individual wheel suspension elements, each individual wheel suspension element comprising:
a swing arm having a lower end and an upper end;
a road wheel axle connected to the lower end of the swing arm;
a swing arm shaft connected to the upper end of the swing arm; and
the swing arm shaft extending through the frame of the vehicle and through a spring having a first end and a second end, the swing arm shaft pivotally attached to the first end of the spring and the second end of the spring connected to the frame.

2. An individual wheel suspension system for a scale vehicle of claim 1 wherein the road wheel axle of at least one of the plurality of individual wheel suspension elements further comprises a road wheel bolt covered by a tube sleeve, the tube sleeve being connected to the lower end of the swing arm.

3. An individual wheel suspension system for a scale vehicle of claim 2 wherein the road wheel bolt of at least one of the plurality of individual wheel suspension elements is connected to a drive system and to a wheel of the vehicle to transfer rotational force from the drive system to the wheel.

4. An individual wheel suspension system for a scale vehicle of claim 1 wherein the swing arm of at least one of the plurality of individual wheel suspension elements further comprises an extension which interacts with an extension from the frame of the vehicle.

5. An individual wheel suspension system for a scale vehicle of claim 1 wherein at least one of the plurality of individual wheel suspension elements further comprises a curved slot in the frame through which the second end of the spring is connected to the frame of the vehicle.

6. An individual wheel suspension system for a scale vehicle of claim 1 wherein the individual wheel suspension system is comprised of at least four individual wheel suspension elements on each side of the frame.

7. An individual wheel suspension system for a scale vehicle of claim 1 wherein the individual wheel suspension system is comprised of at least eight individual wheel suspension elements on each side of the frame.

8. An individual wheel suspension element for use within a vehicle suspension system for a scale vehicle having a frame comprising:
a swing arm having a lower end and an upper end;

a road wheel axle connected to the lower end of the swing arm;
   a swing arm shaft connected to the upper end of the swing arm; and
   the swing arm shaft extending through the frame of the vehicle and through a spring having a first end and a second end, the swing arm shaft pivotally attached to the first end of the spring and the second end of the spring connected to the frame.

9. An individual wheel suspension element for use within a vehicle suspension system of claim 8 wherein the road wheel axle of at least one of the plurality of individual wheel suspension elements further comprises a road wheel bolt covered by a tube sleeve, the tube sleeve being connected to the lower end of the swing arm.

10. An individual wheel suspension element for use within a vehicle suspension system of claim 8 wherein the swing arm of at least one of the plurality of individual wheel suspension elements further comprises an extension which interacts with an extension from the frame of the vehicle.

11. An individual wheel suspension element for use within a vehicle suspension system of claim 8 wherein at least one of the plurality of individual wheel suspension elements further comprises a curved slot in the frame through which the second end of the spring is connected to the frame of the vehicle.

* * * * *